United States Patent [19]

Zhou et al.

[11] Patent Number: 5,606,764
[45] Date of Patent: Mar. 4, 1997

[54] WINDSHIELD WIPER SYSTEM HAVING A WIPER BLADE CAPABLE OF RETRACTION FOR HIDDEN PARK

[75] Inventors: Peter S. Zhou, Dayton; Harry C. Buchanan, Jr., Spring Valley; Michael J. McClain, Dayton, all of Ohio

[73] Assignee: ITT Automotive Electrical Systems, Inc., Auburn Hills, Mich.

[21] Appl. No.: 443,367

[22] Filed: May 17, 1995

[51] Int. Cl.⁶ .................................. B60S 1/36; B60S 1/32
[52] U.S. Cl. ................................... 15/250.16; 15/250.23; 15/250.32; 15/250.19; 15/250.351; 74/42; 74/567
[58] Field of Search ........................... 15/250.23, 250.21, 15/250.16, 250.17, 250.3, 250.351, 250.13, 250.19, 250.32; 74/42, 567

[56] References Cited

U.S. PATENT DOCUMENTS

| | | | |
|---|---|---|---|
| 2,356,424 | 8/1944 | Paton | 15/250.23 |
| 3,247,540 | 4/1966 | Howard et al. | 15/250.23 |
| 4,512,056 | 4/1985 | Wattier | 15/250.23 |
| 4,716,612 | 1/1988 | D'Alba | 15/250.23 |
| 4,791,696 | 12/1988 | Durtnal | 15/250.23 |
| 5,119,523 | 6/1992 | Unterborn | 15/250.16 |
| 5,181,293 | 1/1993 | Baumgarten et al. | 15/250.21 |

*Primary Examiner*—Gary K. Graham
*Attorney, Agent, or Firm*—Thomas N. Twomey; J. Gordon Lewis

[57] ABSTRACT

A windshield wiper system for automotive vehicles includes a mechanism for causing a wiper blade assembly to swing, relative to the wiper arm, between an extended position of the wiper blade assembly and a retracted position of the wiper blade assembly. More specifically, the mechanism causes a link, which is attached to the wiper blade assembly, to swing as the wiper arm moves into and out of the hidden park position. A first embodiment includes a "four-bar linkage" which transfers to oscillatory movement of a drive arm of a wiper system to pivotal movement of the link over a limited range of motion of the drive arm corresponding to movement of the wiper blade assembly into and out of the hidden park position. A second embodiment includes a cam element which selectively engages a fixed pin over a range of motion of the drive arm corresponding to movement of the wiper blade assembly into and out of the hidden park position.

9 Claims, 6 Drawing Sheets

WINDSHIELD WIPER SYSTEM HAVING A WIPER BLADE CAPABLE OF RETRACTION FOR HIDDEN PARK

FIELD OF THE INVENTION

This invention relates to windshield wiper arrangements for automotive vehicles having a wiper blade which is extended during operation relative to the wiper arm, as compared to the position of the wiper blade relative to the wiper arm while the wiper blade is in the "hidden park position." In this way, the amount of surface area of the windshield which is wiped (defined by the lower "inwipe" position, the upper "outwipe" position, and the distances from the wiper arm oscillation point to the innermost and outermost points of the wiper blade) is increased.

BACKGROUND OF THE INVENTION

As windshields become more and more sloped, a wiper which is long enough to wipe a sufficient area of the windshield to comply with Federal Motor Vehicle Safety Standards (FMVSS) might be so long that it would hit an obstruction if it were made to park at its normal wiping length. This design requirement is presently particularly troublesome for the passenger's side (i.e., right) windshield wiper of a pair of wipers that move back and forth in the familiar tandem pattern. In the future, this design requirement could also become a consideration in the design of a driver's side (i.e., left) windshield wiper or a rear window windshield wiper. The obstruction for a passenger's side windshield wiper is the side edge molding of the windshield itself or another vehicle body component, such as the hood hinge. In other words, there is only so much space available along the recess just below the lower windshield edge in which to park the wiper.

A wiper which is fabricated shorter in order to be accommodated in the available wiper parking space will not be in compliance with FMVSS. More specifically, such a wiper would be too short to wipe a sufficient area of the windshield to comply with FMVSS. Besides the problem of accommodating the wiper in the limited available space, other factors, such as the effect of freezing rain, snow, or debris, must be taken into consideration in the design of hidden park wiper arrangements. Thus, wiper mechanisms for enlarged windshields in the future will be arranged with arms which extend during operation and retract when being parked. To achieve both FMVSS compliance and provide hidden park, the wiper arm should be shortened by approximately 45 mm to 75 mm when going into the hidden park position and returned to an extended length during operation.

U.S. Pat. No. 5,119,523 discloses a linkage arrangement by which the wiper blade assembly is attached to the remote end of the wiper arm for pivotal movement to extend and retract the wiper blade assembly. In this system, the force of a spring acts on the linkage arrangement thereby causing the wiper blade to achieve its extended position during the normal wipe pattern. As the wiper blade is restored to its hidden park position, an external striker plate exerts a force on the linkage arrangement in a direction opposite to the direction of the force of the spring. In this way, the wiper blade assumes its retracted position.

SUMMARY OF THE INVENTION

The present invention relates to a windshield wiper system having a wiper post, a wiper arm having a first end mounted to the wiper post for oscillatory movement, a wiper blade assembly, and a link attached to the wiper blade assembly and to the wiper arm for pivotal movement relative to the wiper arm. The system also includes a known drive device, such as a wiper motor and a drive arm movable in response to the wiper motor and connected to an end of the wiper post remote from the wiper arm, for imparting oscillatory movement to the wiper arm. The system further includes a mechanical device, connected between the link and the drive device, for imparting relative pivotal movement between the link and the wiper arm in the first pivotal movement direction as the wiper arm passes through a predetermined position (i.e., corresponding to movement of the wiper blade into the hidden park position) in oscillatory movement of the wiper arm in a first oscillatory movement direction. This mechanical device also imparts relative pivotal movement between the link and the wiper arm in the second pivotal movement direction, opposite to the first pivotal movement direction, as the wiper arm passes through the predetermined position in oscillatory movement of the wiper arm in a second oscillatory movement direction, opposite to the first oscillatory movement direction.

According to a first embodiment of the present invention, the mechanical device includes a "four-bar linkage" which serves to convert the oscillatory motion of the drive arm to pivotal movement of the link over a portion of the range of motion of the drive arm corresponding to movement of the wiper blade into and out of the hidden park position. More specifically, this embodiment of the invention includes a drive gear connected to and movable with the drive arm and a driven gear engaged with the drive gear for a portion of the range over which the drive gear is movable. An axle rod has a first end connected to the center of the driven gear and is rotatable with the driven gear and extends upward from the driven gear.

The first pivot bar of the four-bar linkage is non-rotatably attached to the axle rod. A second pivot bar is connected to the first pivot bar and is rotatable relative to the first pivot bar. A third pivot bar is connected to the second pivot bar and is rotatable relative to the second pivot bar. The third pivot bar is non-rotatably connected to a sleeve, which surrounds and is concentric with the wiper post.

A drive disc is connected to the second end of the sleeve and is rotatable with the sleeve. A drive rod has a first end connected to the drive disc and is rotatable relative to the drive disc and has a second end connected to the link. As the sleeve rotates to cause rotation of the drive disc, the drive rod is moved back and forth, thereby causing the link to pivot. Consequently, as the link pivots, the wiper blade assembly is caused to move between its retracted position and its extended position. Preferably, a stabilizer rod is pivotally connected to the wiper arm and the wiper blade assembly to move pivotally with the link.

According to a second embodiment of the present invention, the mechanical device includes a cam element which is pivotally mounted to the drive arm. A fixed pin, which is mounted to a lock plate surrounding the wiper post, engages a recess of the cam element and causes the cam element to pivot upon movement of the drive arm corresponding to movement of the wiper blade into and out of the hidden park position.

The second embodiment of the present invention also includes a drive gear which is coupled to and rotatable with the cam element. A driven gear, engaged with the drive gear, is aligned with the wiper post. Rotatable with the driven gear is a drive shaft, which is concentric with, encircled by and rotatable relative to the wiper post. A drive cable extends along the wiper arm from the top of the drive shaft to the link. Gears, at the junctions of the drive cable and the drive shaft and the drive cable and the link, permit the rotational movement of the drive shaft to be transferred to pivotal movement of the link as the wiper blade moves into and out of the hidden park position.

It is to be understood that both the foregoing general description and the following detailed description are exemplary, but not restrictive, of the invention.

BRIEF DESCRIPTION OF THE DRAWINGS

The invention is best understood from the following detailed description when read in connection with the accompanying drawings, in which.

DETAILED DESCRIPTION OF THE INVENTION

Figure 1:
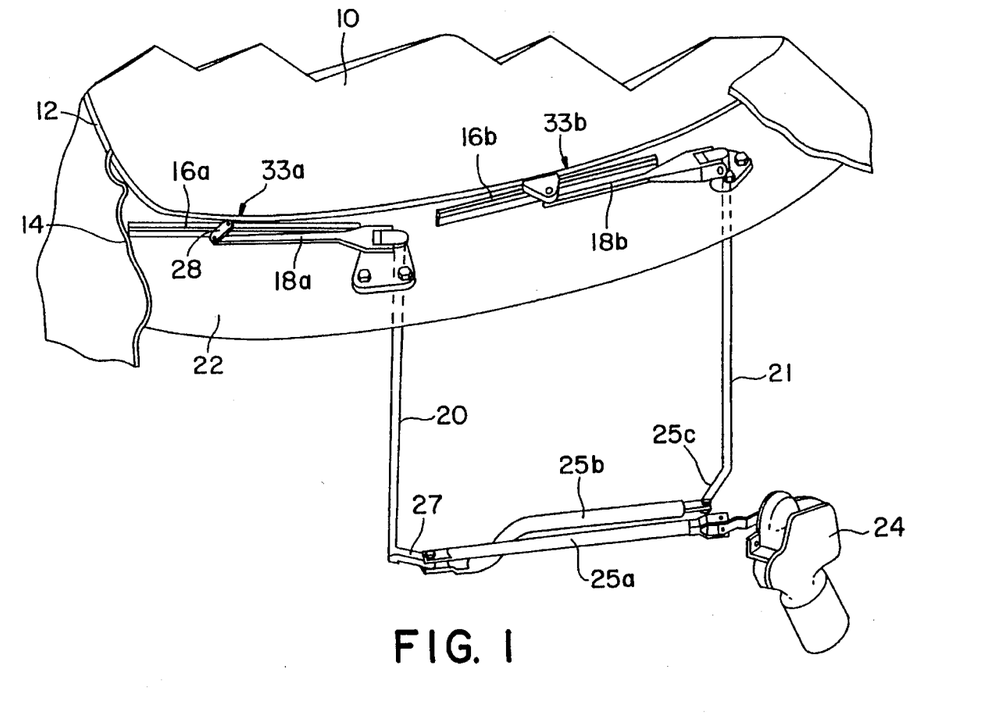
FIG. 1 is a perspective view of a portion of a vehicle body, a windshield, and a drive unit for windshield wipers, with which a wiper system in accordance with the present invention may be used.

FIG. 1 shows a portion of the vehicle body which is the environment for a wiper system in accordance with the present invention. More specifically, FIG. 1 shows a windshield 10, a portion of a vehicle body 12 and a side edge molding 14 of the windshield, which confines the passenger's side wiper blade 16a. Depending on the particular design of the vehicle, other components, such as a hood hinge, could be obstructions to wiper blade 16a. Wiper blade 16b is the wiper blade for the driver's side of the automotive vehicle. Wiper blade assemblies 33a and 33b, which include wiper blades 16a and 16b, are respectively mounted to wiper arms 18a and 18b. Wiper arm 18a is connected at one end to a wiper post 20, which may be tubular, and wiper arm 18b is coupled at one end to a wiper post 21.

FIG. 1 also shows a conventional wiper drive system for imparting oscillatory movement to wiper arms 18a and 18b from a lower "inwipe" position to an upper "outwipe" position during normal wiping. Wiper posts 20, 21 extend downward below a sheet metal portion 22 of the automotive vehicle. A conventional drive device, such as a wiper motor 24, causes rotation of wiper post 20 drive bar 25a and a drive arm 27. Similarly, wiper motor 24 causes rotation of wiper post 21 through drive bars 25a, 25b, and 25c, which are pivotally connected to one another.

FIG. 1 does not show the components which cause wiper blade 16a to extend relative to wiper arm 18a as wiper blades 16a and 16b move out of the hidden park position. FIG. 1 does show wiper blades 16a and 16b in the hidden park position, which means a position in a recess below the lower windshield edge. This position is contrasted with the lower "inwipe" position which is the lower position wiper blades 16a and 16b oscillate to and from during normal wiping. The upper "outwipe" position is the upper position which wiper blades 16a and 16b oscillate to and from during normal wiping.

Figure 5A:
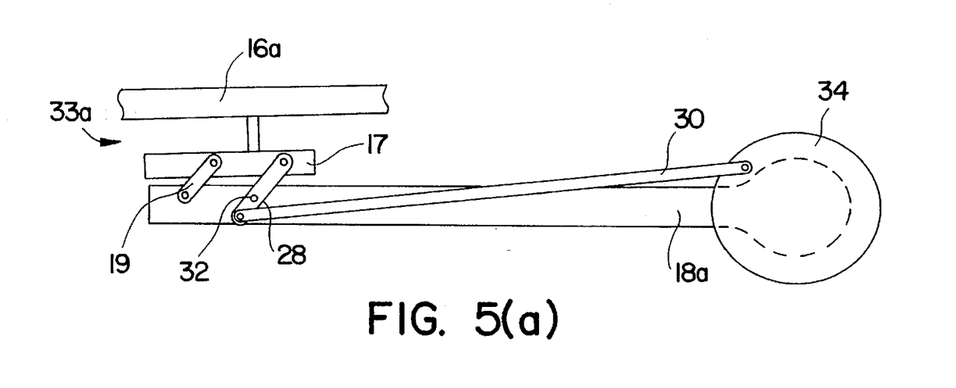
FIGS. 5(a), 5(b), and 5(c) are top plan views of a wiper arm and wiper blade in accordance with the first embodiment with the wiper blade in its retracted, intermediate, and extended positions, respectively.
Figure 5B:
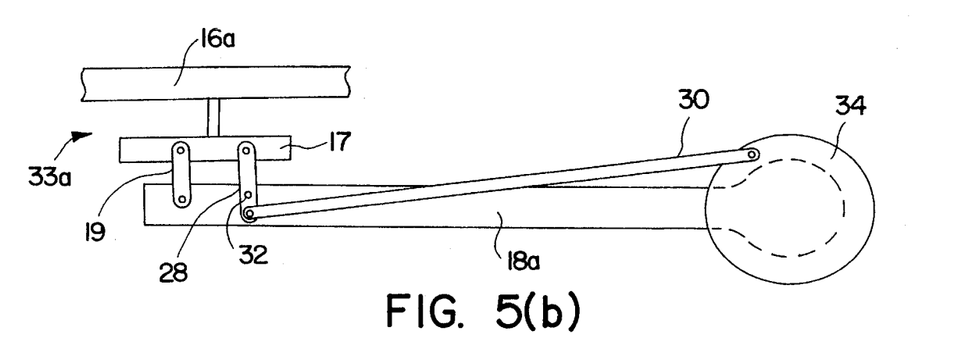
Figure 5C:
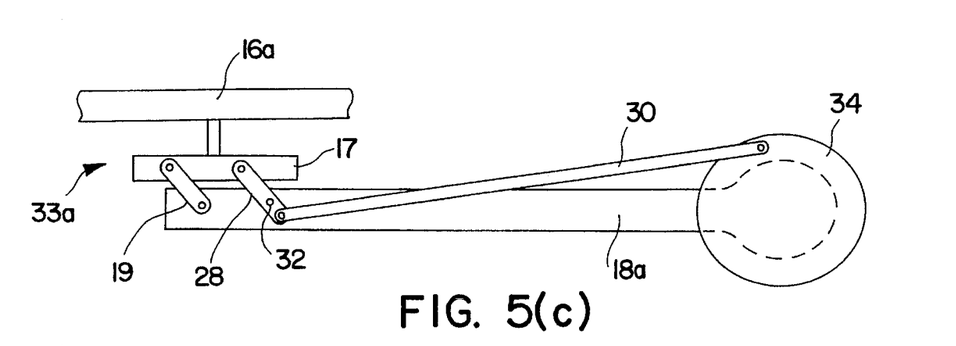

As shown in FIG. 1, a link 28 is attached to wiper blade 16a and to wiper arm 18a. Link 28 (and link 99 as described in connection with the second embodiment of the present invention) is adapted to permit pivotal movement relative to wiper arm 18a in a first direction and a second direction opposite to the first direction. The present invention serves to drive the link to move wiper blade 16a between its retracted position, when in hidden park, and its extended position during normal wiping. FIGS. 5(a), 5(b), and 5(c) show another aspect of the embodiment shown in FIG. 1, in that FIGS. 5(a), 5(b), and 5(c) show a wiper blade assembly 33a having both a wiper blade 16a and a wiper blade base 17, mounted in parallel to wiper blade 16a. Also, FIGS. 5(a), 5(b), and 5(c) show a stabilizer rod 19 which is pivotally connected to wiper arm 18a and wiper blade 16a and which moves pivotally in conjunction with link 28. These additional features shown in FIGS. 5(a), 5(b), and 5(c) are preferred in that stabilizer bar 19 helps to keep wiper blade 16a parallel to wiper arm 18a, which is important to distribute evenly the force necessary for properly wiping the windshield.

As wiper arm 18a passes through a predetermined position while undergoing oscillatory movement in a first oscillatory movement direction (i.e., from the hidden park position to the inwipe position), the present invention imparts to the link relative pivotal movement between the link and wiper arm 18a in a first pivotal movement direction. Similarly, as wiper arm 18a passes through the predetermined position while undergoing oscillatory movement in a second oscillatory movement direction (i.e., from the inwipe position to the hidden park position), the present invention imparts to the link relative pivotal movement between the link and wiper arm 18a in a second pivotal movement direction, opposite to in the first pivotal movement direction. The "predetermined position" is an arc within the range of motion of the wiper arm, between the hidden park position and the inwipe position, over which it would be suitable to cause extension of or retraction of a wiper blade. The specific location of this arc would vary depending on the particular design of the automotive vehicle, such as the obstructions to the wiper blade, the desired length of extension of the wiper blade, and the angular distance between the hidden park position and the inwipe position.

As shown in FIGS. 2, 3, 4, 5(a), 5(b), and 5(c), the first embodiment of the present invention achieves the pivotal movement of wiper blade 16a through a mechanism which moves a drive rod 30, which is coupled at a first end to a drive disk 34 and is rotatable relative to drive disk 34. Drive rod 30 is connected to an end of link 28. Link 28 is pivotally connected to wiper arm 18a at a pivot point 32. The other end of link 28 is connected to wiper blade base 17. The placement of pivot point 32 along link 28 is one way in which the relative distance over which wiper blade 16a moves from its retracted position, as shown in FIG. 5(a), to its extended position, as shown in FIG. 5(c), can be adjusted. More specifically, as pivot point 32 is moved closer to the end of link 28 which is connected to drive rod 30, wiper blade 16a will move a relatively greater distance upon movement of drive rod 30. Similarly, if pivot point 32 is moved closer to the end of link 28 which is attached to wiper blade 16a, wiper blade 16a will move a shorter distance upon movement of drive rod 30. The length of stabilizer rod 19 is the length of the portion of link 28 which extends from pivot point 32 to wiper blade base 17.

Figure 2:
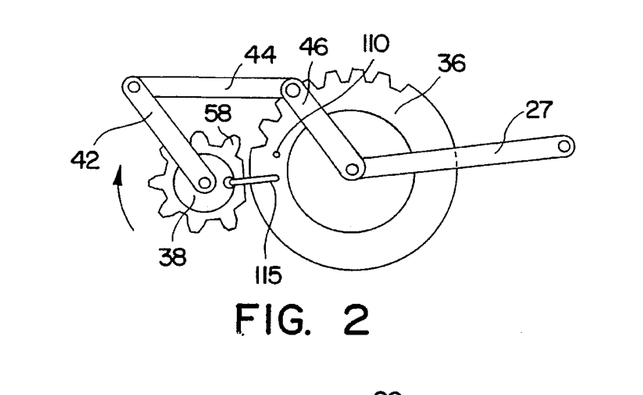
FIG. 2 is a top plan view of a portion of a wiper system in accordance with a first embodiment of the present invention.
Figure 3:
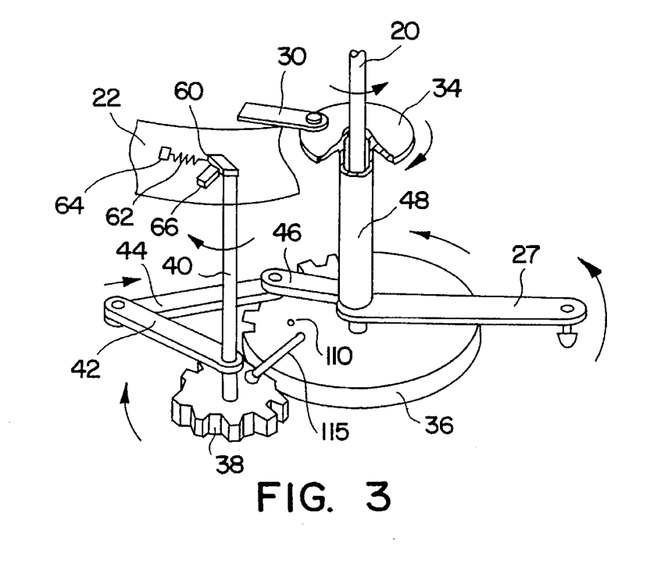
FIG. 3 is a perspective view of generally the same portion of the first embodiment shown in FIG. 2.
Figure 4:
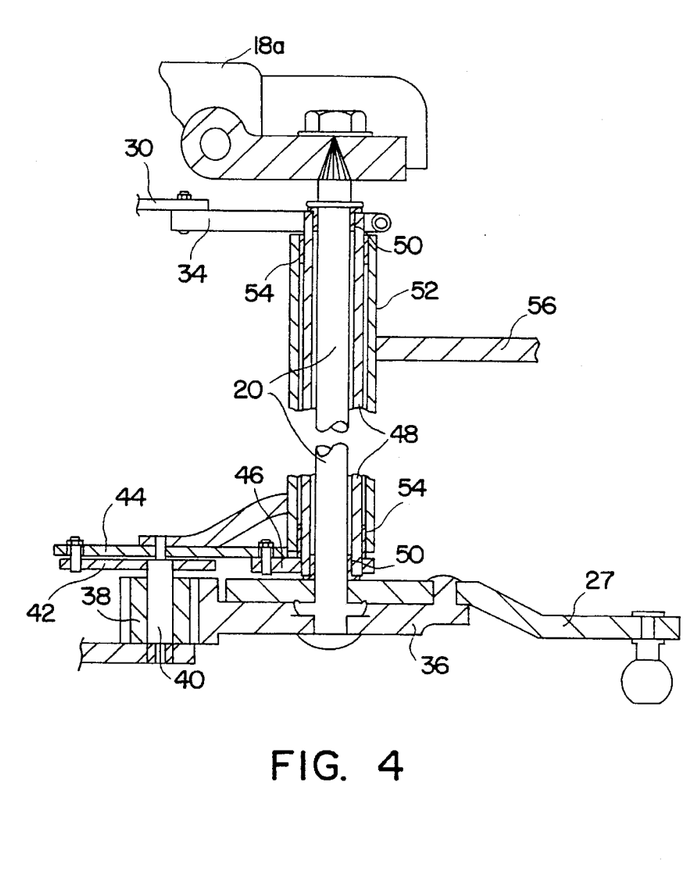
FIG. 4 is a cross-sectional view of generally the same portion of the first embodiment shown in FIG. 2.

As shown in FIGS. 2, 3, and 4, a drive gear 36 is coupled to and rotatably movable with drive arm 27. A driven gear 38 is engaged with drive gear 36 for a portion of the range over which drive gear 36 is movable. More specifically, driven gear 38 is engaged with drive gear 36 for a portion of the range of motion of drive arm 27 corresponding to movement of wiper blade 16a into and out of the hidden park position. This selective engagement between drive gear 36 and driven gear 38 can be done in any known manner. For example, as shown in FIG. 1, drive gear 36 only has teeth over a portion of its periphery corresponding to movement of wiper blade 16a into and out of the hidden park position. Driven gear 38 may or may not have teeth around its entire periphery.

As shown in FIGS. 2 and 3, driven gear 38 has a concave flat portion which is presented to drive gear 36 during normal wiping so that the gears are not engaged during normal wiping. A strike plate 115 is mounted on driven gear 38 and extends into a plane above drive gear 36. An actuating pin 110 is mounted on a point on drive gear 36 such that actuation pin 110 strikes strike plate 115 as wiper blade 16a moves into the hidden park position. The striking of strike plate 115 by actuation pin 110 causes rotation of driven gear 38 such that driven gear 38 engages drive-gear 36, beginning at tooth 58.

Driven gear 38 is coaxially mounted with (i.e., sharing an axle and rotatable with) a first pivot bar 42. The shared axle of driven gear 38 and first pivot bar 42 is axle rod 40, which is mounted at a first end to the center of driven gear 38. As shown in FIGS. 2, 3, and 4, a second pivot bar 44 is pivotally connected to first pivot bar 42, and thereby can rotate relative to first pivot bar 42. Similarly, a third pivot bar 46 is pivotally connected to second pivot bar 44, and thereby can rotate relative to second pivot bar As shown in FIG. 4, third pivot bar 46 is non-rotatably connected to a sleeve 48 at a first end of the sleeve. Sleeve 48 surrounds and is concentric with wiper post 20 and can rotate relative to wiper post 20 with bearings 50 disposed between wiper post 20 and sleeve 48. Surrounding sleeve 48 is a housing 52. Bearings 54 are disposed between housing 52 and sleeve 48 to permit rotation of sleeve 48 within housing 52. The wiper system is mounted to a sheet metal part or a casting of the vehicle by a mounting piece 56 connected to housing 52. At the end of sleeve 48 remote from third pivot bar 46, sleeve 48 is coaxially mounted with drive disk 34, so that with rotation of sleeve 48, drive disk 34 also rotates. With rotation of drive disc 34, drive rod 30, which is pivotally mounted to drive disc 34, moves back and forth to impart pivotal movement to link 28, as described above.

In order to ensure that driven gear 38 stays in the correct position during normal wiping, a stopper and spring assembly is attached to axle rod 40, as shown in FIG. 3. More specifically, a link 60 is mounted to axle rod 40 and extends radially outward from axle rod 40. The rod can extend through a fixed planer surface, such as sheet metal surface 22 of an automotive vehicle. A spring 62 urges link 60 towards a point on the fixed planer surface, such as a spring clasp 64. Disposed between link 60 and spring clasp 64 is a stopper 66 mounted on sheet metal 22.

The positioning of the gears in FIG. 3 can correspond to wiper blades 16a and 16b being in the hidden park position, as the teeth of driven gear 38 are engaged with the teeth of drive gear 36. This engagement of the teeth between the two gears resists the force of spring 62, thereby preventing the rotation of axle rod 40. During normal wiping, however, the teeth of the two gears are not engaged with one another so that driven gear 38 would normally be free to rotate. The force of spring 62, however, prevents such free rotation by urging link 60 against stopper 66 during normal wiping. This positions driven gear 38 such that actuating pin 110 will strike strike plate 115 upon movement of drive arm 27 corresponding to movement of wiper blade 16a into the hidden park position to cause engagement of drive gear 36 with driven gear 38.

In the operation of the first embodiment of the present invention, when the windshield wiper system is off, the system is in the position as shown in FIGS. 1, 2, and 3, and the wiper arm 16a is in its retracted position as show in FIG. 5(c). Upon actuation of the windshield wiper switch, wiper motor 24 moves drive arm 27 towards a position corresponding to the inwipe position of wiper blades 16a and 16b from a position corresponding to the hidden park position of wiper blades 16a and 16b. Because drive gear 36 is non-rotatably mounted to drive arm 27, drive gear 36 rotates with drive arm 27, causing rotation of driven gear 38 for only a portion of the range over which drive gear 36 and driven gear 38 are in engagement. The specific gear ratios can be adjusted according to the particular design requirements of the automotive vehicle.

With rotation of driven gear 38, axle rod 40 is caused to rotate, thereby causing a pivotal movement of first pivot bar 42. This causes linear movement of second pivot bar 44 and subsequent pivotal movement of third pivot bar 46. Third pivot bar 46, which is non-rotatably mounted to sleeve 48, causes rotation of sleeve 48 which, in turn, causes rotation of drive disk 34. As drive disk 34 rotates, drive rod 30 pulls the end of link 28 to which drive rod 30 is connected. Thus, wiper blade 16a is moved from the retracted position shown in FIG. 5(a), to the intermediate position shown in FIG. 5(b), and finally to the extended position shown in FIG. 5(c).

Wiper blade 16a is maintained in its extended position during normal wiping by virtue of the weight and force of wiper arm 18a on wiper blade 16a and drive arm 27 not extending to a position which would cause engagement of the teeth of drive gear 36 with the teeth of driven gear 38 during normal wiping. This engagement occurs only as wiper blade 16a moves between the inwipe position and the hidden park position.

Figure 6:
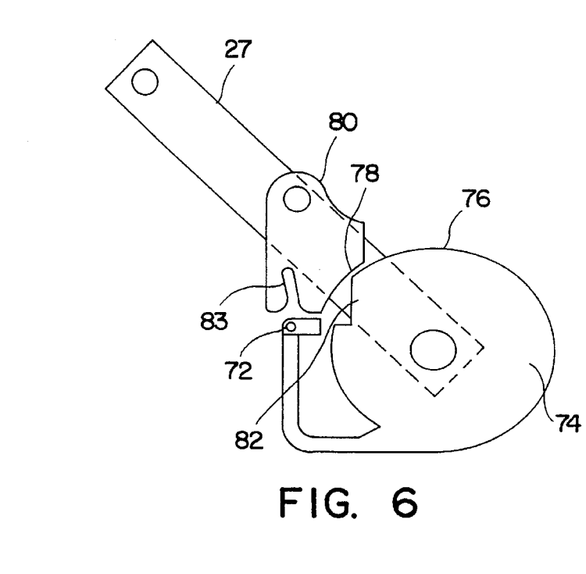
FIG. 6 is a top plan view of a portion of a wiper system in accordance with a second embodiment of the present invention.
Figure 7:
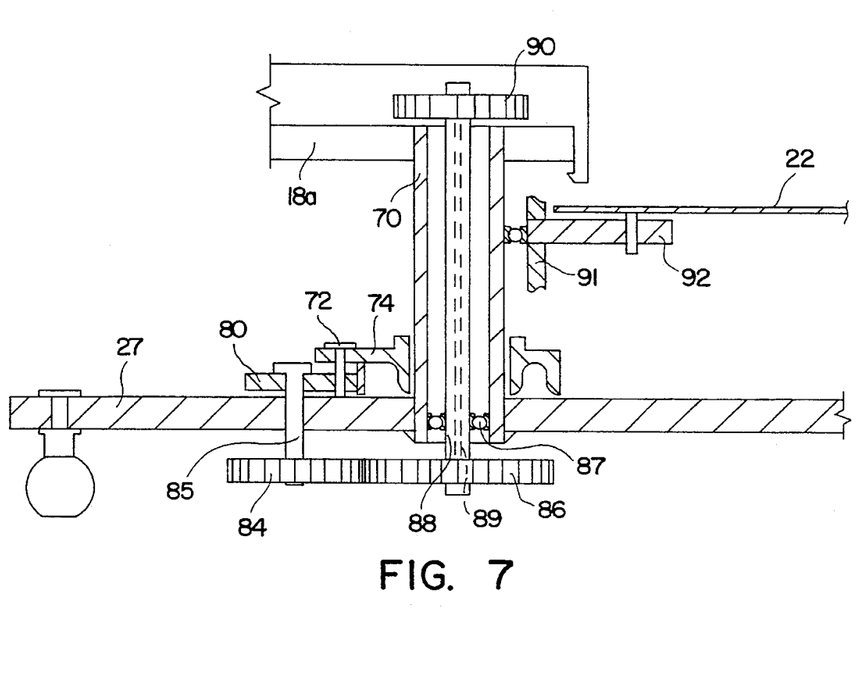
FIG. 7 is a cross-sectional view of generally the same portion of the second embodiment shown in FIG. 6.

FIGS. 6, 7, 8, and 9 show various parts of a wiper system in accordance with a second embodiment of the present invention. Reference numerals used in explaining this embodiment of the invention, which are the same as those used in explaining the first embodiment, represent similar elements. As shown in FIG. 7, wiper arm 18a is connected to a wiper post 70 which is tubular. In order to cause oscillation of wiper arm 18a, wiper motor 24, through drive bar 25a, causes oscillation of drive arm 27 which is connected to an end of wiper post 70 remote from the end of wiper post 70 which is connected to wiper arm 18a. Thus, in a known manner, wiper arm 18a is caused to oscillate in a back and forth motion during normal wiping.

As shown in FIGS. 6 and 7, a fixed pin 72 is mounted to a lock plate 74. Lock plate 74 is disposed around wiper post 70 near the end of wiper post 70 remote from where wiper post 70 is connected to wiper arm 18a. A cam element 80 is pivotally mounted to drive arm 27 and has a recess 83 which engages pin 72 upon movement of drive arm 27. This engagement causes cam element 80 to pivot upon movement of the drive arm corresponding to movement of wiper blade 16a between the inwipe position and the hidden park position. More specifically, as drive arm 27 moves counterclockwise, as viewed in FIG. 6, pin 72 will strike the right-hand wall, as viewed in FIG. 6, of recess 83 of cam element 80. With further counterclockwise movement of drive arm 27, cam element 80 will be caused to rotate counterclockwise. Similarly, as drive arm 27 moves clockwise into the position shown in FIG. 6 (corresponding to movement of wiper blade 16a from the hidden park position to the inwipe position), pin 72 will strike the left-hand wall, as viewed in FIG. 6, of recess 83 of cam element 80. With further clockwise movement of drive arm 27, cam element 80 will be caused to rotate clockwise. Lock plate 74 includes a recess 82 to ensure clearance between cam element 80 and lock plate 74 as cam element 80 rotates. As shown in FIG. 6, lock plate 74 has a curved outer surface 76, which abuts against curved outer surface 78 of cam element 80 to prevent pivotal movement of cam element 80 during normal wiping.

A drive gear 84 is coaxially mounted with cam element 80 through a shaft 85. A driven gear 86 is engaged with drive gear 84 and is caused to rotate upon rotation of drive gear 84. Driven gear 86 is coaxially mounted with a drive shaft 88. Drive shaft 88 is concentric with, encircled by, and rotatable relative to wiper post 70 by means of bearings 87. A circular gear 90 is mounted to the end of drive shaft 88 remote from the end of drive shaft 88 to which driven gear 86 is mounted. Preferably, drive shaft 88 has a longitudinally extending recess 89 for accommodating a windshield washer hose (not shown).

Figure 8A:
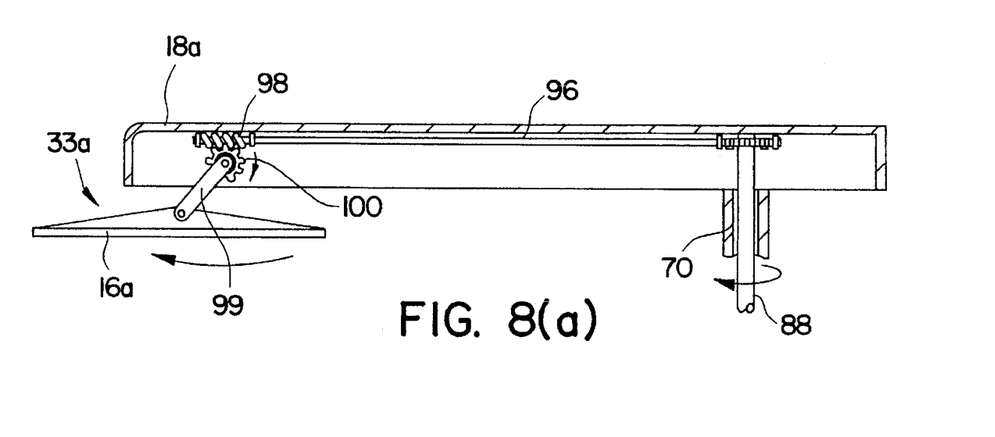
FIGS. 8(a), 8(b), and 8(c) are partial sectional views of a wiper arm and wiper blade, which is out of scale, in accordance with the second embodiment with the wiper blade in its extended, intermediate, and retracted positions, respectively.
Figure 8B:
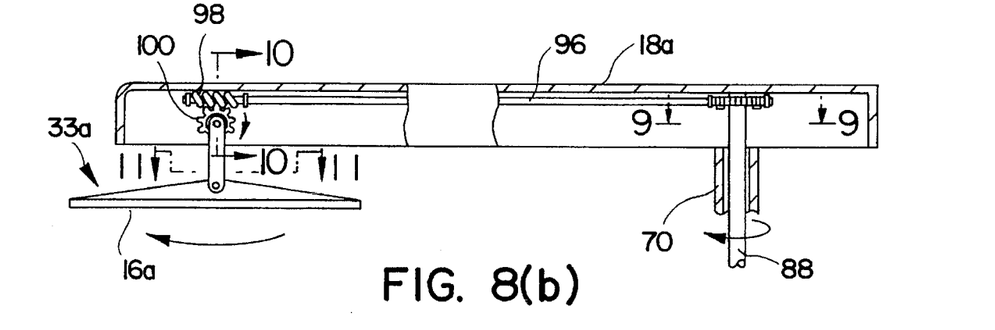
Figure 8C:
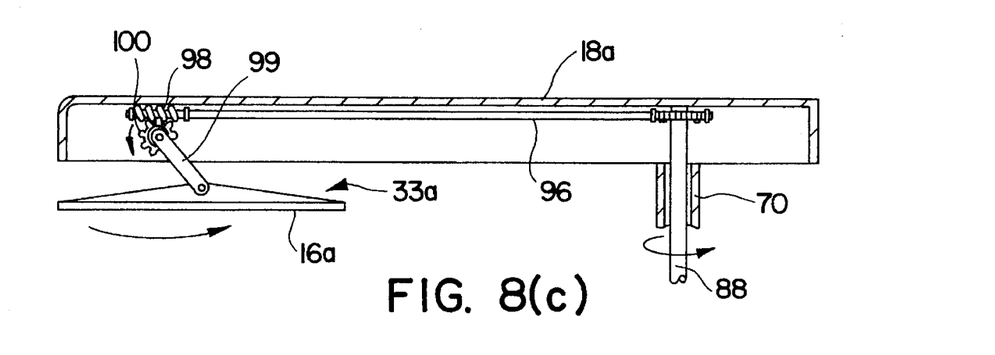
Figure 9:
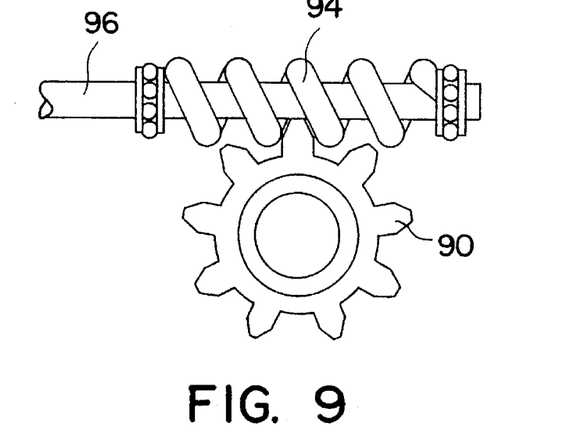
FIG. 9 is a view along the line 9—9 of FIG. 8(b)
Figure 10:
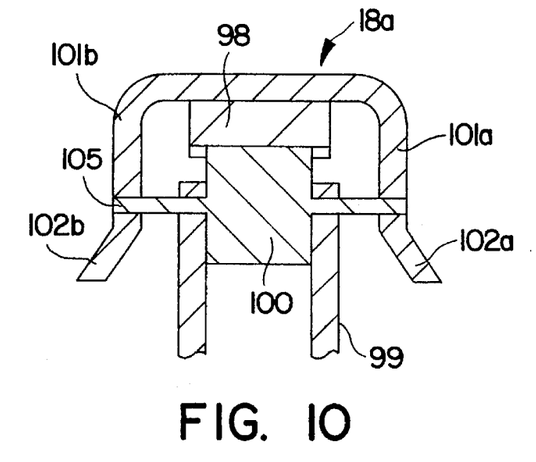
FIG. 10 is a cross-sectional view along the line 10—10 of FIG. 8(b)

As shown in FIGS. 9 and 10, gear 90 engages a first helical gear 94 which is mounted on a drive cable 96 extending along the wiper arm. Preferably, drive cable 96 is flexible to conform with any curvature of wiper arm 18a. Helical gear 94 is configured to cause rotation of drive cable 96 in response to rotation of gear 90. As shown in FIGS. 8(a), 8(b), and 8(c), a second helical gear 98 is attached to drive cable 96 at the other end of the drive cable. A link 99, connected at one end to a worm wheel 100 and at the other end to wiper blade assembly 33a, undergoes pivotal movement relative to wiper arm 18a as worm wheel 100 is driven by helical gear 98 which turns in response to rotation of drive cable 96 which, in turn, is rotated by helical gear 94. The direction of rotation of worm wheel 100 and the direction of pivotal movement of link 99 depend upon the direction of rotation of helical gear 94, drive cable 96 and helical gear 98. As shown in FIG. 10, hinge pin 105 rotatably secures link 99 and worm wheel 100 to wiper arm 18a.

Figure 11:
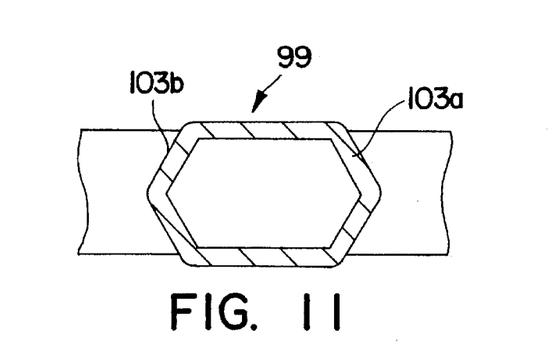
FIG. 11 is a partial cross-sectional view along the line 11—11 of FIG. 8(b).

As shown in FIG. 11, link 99 has a hexagonal cross section. As shown in FIG. 10, walls 101a and 101b of wiper arm 18a have outwardly extending flanges 102a and 102b which are disposed at an angle for abutting against the side walls 103a and 103b of link 99 when wiper blade 16a is either in its extended position during normal wiping or its retracted position during hidden park. The force caused by the weight of wiper arm 18a is transferred downward against link 28 so that the outwardly extending flanges 102a and 102b abut against side walls 103a and 103b of link 99. This abutment of surfaces permits the appropriate amount of wiping force to be transmitted from wiper arm 18a to wiper blade 16a and also relieves some of the load on the other components of this system, such as worm wheel 100 and link 99.

As shown in FIG. 7, wiper post 70 is disposed within a housing 91 to which a mounting part 92 is connected or made integral therewith. Mounting part 92 may be connected to any vehicle part suitable for mounting a wiper system of the invention, such as sheet metal surface 22.

In operation, as drive arm 27 is caused to oscillate by wiper motor 24 from a position corresponding to the hidden park position to the inwipe position of wiper blade 16a, cam element 80 is caused to pivot clockwise (as viewed in FIG. 6) as described above, thereby causing rotational movement of drive gear 84 through shaft 85. Drive gear 84 causes rotation of driven gear 86 which, in turn, causes the rotation of drive shaft 88. Rotation of drive shaft 88, in turn, causes the rotation of circular gear 90, which causes rotation of drive cable 96 via first helical gear 94. With the rotation of drive cable 96 and second helical gear 98, link 99 is caused to rotate which causes movement of wiper blade 16a from its retracted position as shown in FIG. 8(c), to the intermediate position shown in FIG. 8(b), and finally to the extending position shown in FIG. 8(a).

As drive arm 27 is caused to oscillate by wiper motor 24 from a position corresponding to the inwipe position to the hidden park position of wiper blade 16a, cam element 80 is caused to pivot counterclockwise (as viewed in FIG. 6) as described above, thereby causing rotational movement of drive gear 84 through shaft 85. As before, this pivotal movement is transferred through shaft 85, drive gear 84, driven gear 86, drive shaft 88, circular gear 90, first helical gear 94, drive cable 96, second helical gear 98, and worm wheel 100 to link 99, except that the moving components are moving in the opposite directions than when going from hidden park to normal wiping. With this motion, wiper blade 16a is caused to return to its retracted position as shown in FIG. 8(c) while in hidden park.

In both embodiments, the device which imparts relative pivotal movement between the link and the wiper arm includes at least one component which is directly connected to the drive device (i.e., wiper motor 24 and drive arm 27). For example, in the first embodiment, drive gear 36 is directly connected to drive arm 27. In the second embodiment, shaft 85, to which is connected cam element 80, is directly connected to drive arm 27. These connections are internal to the vehicle, such as below sheet metal surface 22, and therefore are disposed in a relatively clean environment.

Although the invention is illustrated and described herein with reference to certain specific embodiments, the claims are not intended to be limited to the details shown. Rather, the claims should be read to include various modifications of the details shown without departing from the spirit of the invention. For example, the embodiments described above refer to the use of the invention for the wiper for the passenger's side (i.e., right) windshield wiper. Nonetheless, the system of the present invention could also be used to extend and retract a wiper blade for a driver's side (i.e., left) windshield wiper or a rear window windshield wiper.

What is claimed:

1. A windshield wiper system comprising:

a tubular wiper post;

a wiper arm having a first end mounted to said wiper post for oscillatory movement;

a wiper blade assembly;

a link pivotally attached to said wiper blade assembly and to said wiper arm for:
   (a) pivotal movement relative to said wiper arm in a first direction, and
   (b) pivotal movement relative to said wiper arm in a second direction opposite to the first pivotal movement direction;

drive means for imparting oscillatory movement to said wiper arm, said drive means including:
   (a) a wiper motor, and
   (b) a drive arm driven by said wiper motor and connected to an end of said wiper post remote from said wiper arm; and means connecting said link and said drive means comprising:
   (a) a fixed pin; and
   (b) a cam element, pivotally mounted to said drive arm and having a recess which engages said pin and causes said cam element to pivot upon movement of said drive arm, for:
   imparting relative pivotal movement between said link and said wiper arm in the first pivotal movement direction as said wiper arm passes through a predetermined position in oscillatory movement of said wiper arm in a first oscillatory movement direction, and
   imparting relative pivotal movement between said link and said wiper arm in the second pivotal movement direction opposite to the first pivotal movement direction as said wiper arm passes through said predetermined position in oscillatory movement of said wiper arm in a second oscillatory movement direction opposite to said first oscillatory movement direction.

2. A windshield wiper system in accordance with claim 1 wherein said cam element has a curved radially inner surface and further comprising a lock plate to which said pin is mounted, wherein said lock plate:
   (a) is disposed around said wiper post at an end of said wiper post remote from said wiper arm, and
   (b) has a curved radially outer surface against which the curved radially inner surface of said cam element abuts to prevent pivotal movement of said cam element during normal wiping.

3. A windshield wiper system in accordance with claim 2 further comprising:

a drive gear mounted coaxially with said cam element;

a driven gear engaged with said drive gear and aligned with said wiper post; and a drive shaft, mounted coaxially with said driven gear, and concentric with, encircled by and rotatable relative to said wiper post, having a first end coupled to said driven gear and having a second end.

4. A windshield wiper system in accordance with claim 3 further comprising:

a circular gear mounted to said second end of said drive shaft;

a drive cable extending along the wiper arm and having a first end and a second end;

a first helical gear coupled to said drive cable at the first end of said drive cable and engaged with said circular gear for causing rotation of said drive cable; and a second helical gear coupled to said drive cable at the second end of said drive cable.

5. A windshield wiper system in accordance with claim 4 further comprising a worm wheel mounted on said link and engaged with said second helical gear for rotating in response to rotation of said drive cable and for causing pivotal movement of said link.

6. A windshield wiper system in accordance with claim 7, wherein said wiper arm has a bottom wall and two side walls and side wide walls are flanged outwardly at an area near said link, and said link has a hexagonal cross-section for abutting against said outwardly flanged side walls when said wiper blade is in an extended position and in a retracted position.

7. A windshield wiper system in accordance with claim 3, wherein said drive shaft has a longitudinally extending recess for accommodating a windshield washer hose.

8. A windshield wiper system in accordance with claim 1, wherein said means for imparting relative pivotal movement between said link and said wiper arm include at least one component directly connected to said drive means.

9. A windshield wiper system in accordance with claim 1, wherein said connecting means further comprising:
   (c) a gear means extending between said cam element and said link for translating the pivotal movement of said cam element to said relative pivotal movement between said link and said wiper arm.

* * * * *

UNITED STATES PATENT AND TRADE MARK OFFICE
CERTIFICATE OF CORRECTION

PATENT NO. : 5,606,764
DATED : March 4, 1997
INVENTOR(S) : Peter S. Zhou et al.

It is certified that error appears in the above-identified patent and that said Letters Patent is hereby corrected as shown below:

Column 10, claim 6, line 26, delete "7" and substitute therefor --5--.

Signed and Sealed this

Fifteenth Day of July, 1997

*Attest:*

BRUCE LEHMAN

*Attesting Officer*     *Commissioner of Patents and Trademarks*